(12) United States Patent  
Park et al.

(10) Patent No.: US 8,406,335 B2  
(45) Date of Patent: *Mar. 26, 2013

(54) MULTI INPUT MULTI OUTPUT (MIMO) ORTHOGONAL FREQUENCY DIVISION MULTIPLE ACCESS (OFDMA) COMMUNICATION SYSTEM

(75) Inventors: Jong Hyeon Park, San Jose, CA (US); Ju Won Park, San Ramon, CA (US); Je Woo Kim, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/172,369

(22) Filed: Jun. 29, 2011

(65) Prior Publication Data

US 2012/0163306 A1    Jun. 28, 2012

Related U.S. Application Data

(63) Continuation of application No. 11/440,829, filed on May 24, 2006, now Pat. No. 7,974,360.

(51) Int. Cl.
    *H04B 7/02*     (2006.01)
    *H04B 7/08*     (2006.01)
    *H04B 7/06*     (2006.01)
    *H04L 27/00*    (2006.01)

(52) U.S. Cl. ........ 375/267; 375/299; 375/347; 455/101; 455/132

(58) Field of Classification Search .................. 375/267, 375/347, 350, 299, 295, 316, 229, 260; 455/101, 455/132, 137, 139; 370/203, 206, 208, 210

See application file for complete search history.

(56) References Cited

U.S. PATENT DOCUMENTS 6,473,393 B1   10/2002   Ariyavisitakul et al.  
6,600,934 B1    7/2003   Yun et al.

(Continued)

FOREIGN PATENT DOCUMENTS

CN        1674572 A     9/2005  
JP       2003528527      9/2003

(Continued)

OTHER PUBLICATIONS

International Search Report and Written Opinion of the International Searching Authority Dated Jan. 16, 2008, International Application No. PCT/US2007/12401.

*Primary Examiner* — Tesfaldet Bocure  
(74) *Attorney, Agent, or Firm* — Tyler J. Overall

(57) ABSTRACT

The present disclosure includes techniques to process signals in a communication system, in which multiple signal processing units process signals received from multiple antennae. The signal processor units are controlled by operational-mode control signals, which are generated using an estimated Carrier-to-Interference-Noise-Ratio (CINR). The estimated CINR is generated using an equalized and combined signal, which is generated from the received signals and the estimated channel responses using the processed signals according to an operational mode. In another embodiment, a controller generates sub-carrier allocation signals using an allocation base. A channel status information (CSI) and multiple-input-multiple-output (MIMO) controller generates sub-carrier CSI signals and operational-mode control signals using the sub-carrier allocation signals, estimated channel responses, and estimated CINR. The operational-mode control signals select one of multiple antenna paths. A transmitter-diversity processor generates transmitter-diversity signals as a function of at least a mapped signal, sub-carrier CSI signals, and operational mode control signals.

46 Claims, 9 Drawing Sheets

U.S. PATENT DOCUMENTS

| | | |
|---|---|---|
| 6,754,286 B2 | 6/2004 | Hottinen et al. |
| 6,763,225 B1 | 7/2004 | Farmine et al. |
| 6,771,706 B2 | 8/2004 | Ling et al. |
| 6,775,329 B2 | 8/2004 | Alamouti et al. |
| 6,785,520 B2 | 8/2004 | Sugar et al. |
| 6,795,392 B1 | 9/2004 | Li et al. |
| 6,862,271 B2 | 3/2005 | Medvedev et al. |
| 6,873,651 B2 | 3/2005 | Tesfai et al. |
| 7,028,246 B2 | 4/2006 | Kim et al. |
| 7,545,765 B2 | 6/2009 | Larsson et al. |
| 7,567,625 B2 | 7/2009 | Oh et al. |
| 7,586,834 B2 | 9/2009 | Byun et al. |
| 7,974,360 B2 | 7/2011 | Park |
| 2002/0164968 A1 | 11/2002 | Crawford |
| 2004/0023918 A1 | 2/2004 | Monia et al. |
| 2006/0072682 A1 | 4/2006 | Kent et al. |
| 2008/0298335 A1 | 12/2008 | Lee |

FOREIGN PATENT DOCUMENTS

| | | |
|---|---|---|
| JP | 2005151567 A | 6/2005 |
| JP | 2005341603 A | 12/2005 |
| JP | 2006014204 | 1/2006 |
| KR | 20040089748 | 10/2004 |
| RU | 2110159 | 4/1998 |
| RU | 2235430 | 8/2004 |
| WO | WO2005036791 A1 | 4/2005 |
| WO | WO2005069505 | 7/2005 |
| WO | WO2006018702 A1 | 2/2006 |
| WO | WO2006019263 A2 | 2/2006 |
| WO | WO2006022372 A1 | 3/2006 |
| WO | WO2006048934 A1 | 5/2006 |

MULTI INPUT MULTI OUTPUT (MIMO) ORTHOGONAL FREQUENCY DIVISION MULTIPLE ACCESS (OFDMA) COMMUNICATION SYSTEM

CLAIM OF PRIORITY UNDER 35 U.S.C. §120

The present application for patent is a continuation of patent application Ser. No. 11/440,829, filed May 24, 2006 and assigned to the assignee hereof and hereby expressly incorporated by reference herein.

BACKGROUND

1. Field of the Invention

Embodiments of the invention relate to the field of communication, and more specifically, to MIMO OFDMA communication systems.

2. Description of Related Art

MIMO OFDMA systems are becoming popular as a key technology for the next generation of wired and wireless or mobile communications. The Institute of Electrical and Electronics Engineers (IEEE) has provided several standards supporting air interface for fixed and mobile broadband wireless access (BWA) systems using MIMO OFDMA such as the IEEE 802.16e for mobile BWA systems One of the challenges facing MIMO OFDMA systems design is transmitter diversity. Existing techniques to provide transmitter diversity has a number of drawbacks. One technique uses a space time coding (STC) scheme. The STC scheme takes advantage of space and temporal diversities as well as coding gain. This technique suffers performance degradation in no multi-path channel such as Additive White Gaussian Noise (AWGN) channel, requires a special standard supporting STC scheme, and may limit maximum service range. Another technique uses an equal power joint maximum ratio combining method for a beam-forming based system. This technique is complex, requiring complex solutions for weight vectors and complex procedure for calibration. Many other techniques have been proposed but these techniques requires complex processes such as time domain processing, interactive processing, hand-shaking or collaboration between the base station (BS) and the mobile station (MS).

BRIEF DESCRIPTION OF THE DRAWINGS

Embodiments of invention may best be understood by referring to the following description and accompanying drawings that are used to illustrate embodiments of the invention. In the drawings.

DESCRIPTION

Figure 1:
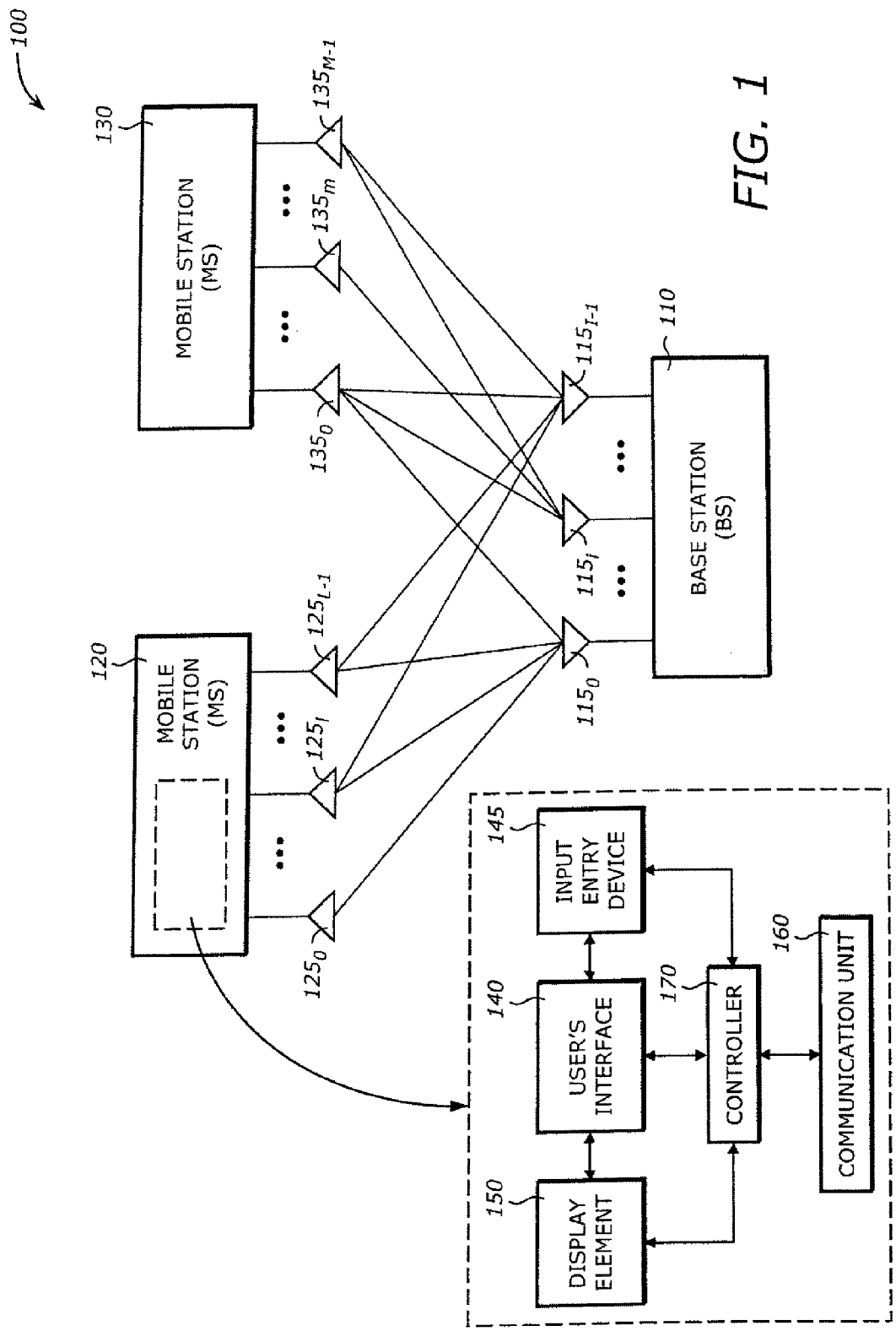
FIG. 1 is a diagram illustrating a system in which one embodiment of the invention can be practiced.

An embodiment of the present invention is a technique to process signals in a communication system. In one embodiment, a plurality of signal processing units processes signals received from a plurality of antennae. The signal processor units are controlled by operational mode control signals. A channel estimator estimates channel responses using the processed signals according to an operational mode. An equalizer and combiner generates an equalized and combined signal using the received signals and the estimated channel responses. A Carrier-to-Interference Noise Ratio (CINR) estimator estimates CINR from the equalized and combined signal. The estimated CINR is used to generate the operational mode control signals. In another embodiment, a sub-carrier allocation controller generates sub-carrier allocation signals using an allocation base. A channel status information (CSI) and multiple input multiple output (MIMO) controller generates sub-carrier CSI signals and operational mode control signals using the sub-carrier allocation signals, estimated channel responses provided by a channel estimator, and an estimated CINR provided by an CINR estimator. The operational mode control signals select one of a plurality of antenna paths associated with a plurality of antennae. A transmitter diversity processor generates transmitter diversity signals as a function of at least a mapped signal $M_k$, the sub-carrier CSI signals, and the operational mode control signals.

In the following description, numerous specific details are set forth. However, it is understood that embodiments of the invention may be practiced without these specific details. In other instances, well-known circuits, structures, and techniques have not been shown to avoid obscuring the understanding of this description.

One embodiment of the invention may be described as a process, which is usually depicted as a flowchart, a flow diagram, a structure diagram, or a block diagram. Although a flowchart may describe the operations as a sequential process, many of the operations can be performed in parallel or concurrently. A loop or iterations in a flowchart may be described by a single iteration. It is understood that a loop index or loop indices or counter or counters are maintained to update the associated counters or pointers. In addition, the order of the operations may be re-arranged. A process terminates when its operations are completed. A process may correspond to a method, a program, a procedure, etc. A block diagram may contain blocks or modules that describe an element, an item, a component, a device, a unit, a subunit, a structure, a method, a process, a function, an operation, a functionality, or a task, etc. A functionality or an operation may be performed automatically or manually.

An embodiment of the invention includes a transmitter processing unit and a receiver processing unit for wired and wireless communications based on MIMO OFDMA techniques. The receiver processing unit provides estimates of the channel responses and CINR to the transmitter processing unit. The transmitter processing unit provides transmitter diversity by selecting a transmitter antenna path using the estimated channel responses and CINR. Transmitter diversity is achieved by selecting the transmitter antenna path which has a better CSI than other transmitter antenna paths for a given bundle. A bundle is a set of sub-carrier indices. The technique has a number of advantages including simple architecture, good performance, reduced power consumption, and does not require special standard specifications.

FIG. 1 is a diagram illustrating a system 100 in which one embodiment of the invention can be practiced. The system 100 includes a base station (BS) 110 and a number of mobile stations. For illustrative purposes, only two mobile stations 120 and 130 are shown. As is known by one skilled in the art, any number of mobile stations may be used.

The base station 110 has a number of antennae $115_0$ to $115_{L-1}$. The mobile station (MS) 120 has a number of antennae $125_0$ to $125_{L-1}$. The MS 130 has a number of antennae $135_0$ to $135_{M-1}$. I, L, and M are any positive integers. The MS 120 or 130 represents any mobile unit or sub-system such as cellular phones, mobile personal digital assistant (PDA), mobile hand-held devices or computers. In one embodiment, the BS 110 and the MS's 120 and 130 are compatible with a MIMO OFDMA standard, such as the IEEE 802.16e.

The MS 120 includes a user's interface 140, an input entry device 145, a display element 150, a communication unit 160, and a controller 170. The user's interface 140 provides interface to the user. It may include graphics user's interface (GUI), menu, icons, etc. The input entry device 145 may include any input entry devices such as keyboard, pointing device (e.g., stylus), mouse, etc. to allow the user to enter data or commands. The display element 150 provides a display. It may be any type of display suitable for mobile devices such as thin-film transistor (TFT) liquid crystal display (LCD), color super-twist nematic (CSTN), double-layer super-twist nematic (DSTN), high-performance addressing (HPA), or any other active or passive-matrix displays. The communication unit 160 receives and transmits data via the antennae $125_0$ to $125_{L-1}$. The communication unit 160 provides transmitter diversity and selects an antenna path from a number of antenna paths using estimates of channel responses and CINR. The controller 170 controls the operation of the MS 120 including processing receive and transmit data, controlling the input entry device 145 and/or the display element 150, and performing other house-keeping tasks. It may include a processor, a digital signal processor, a micro-controller, etc. and associated memory and peripheral devices.

Figure 2:
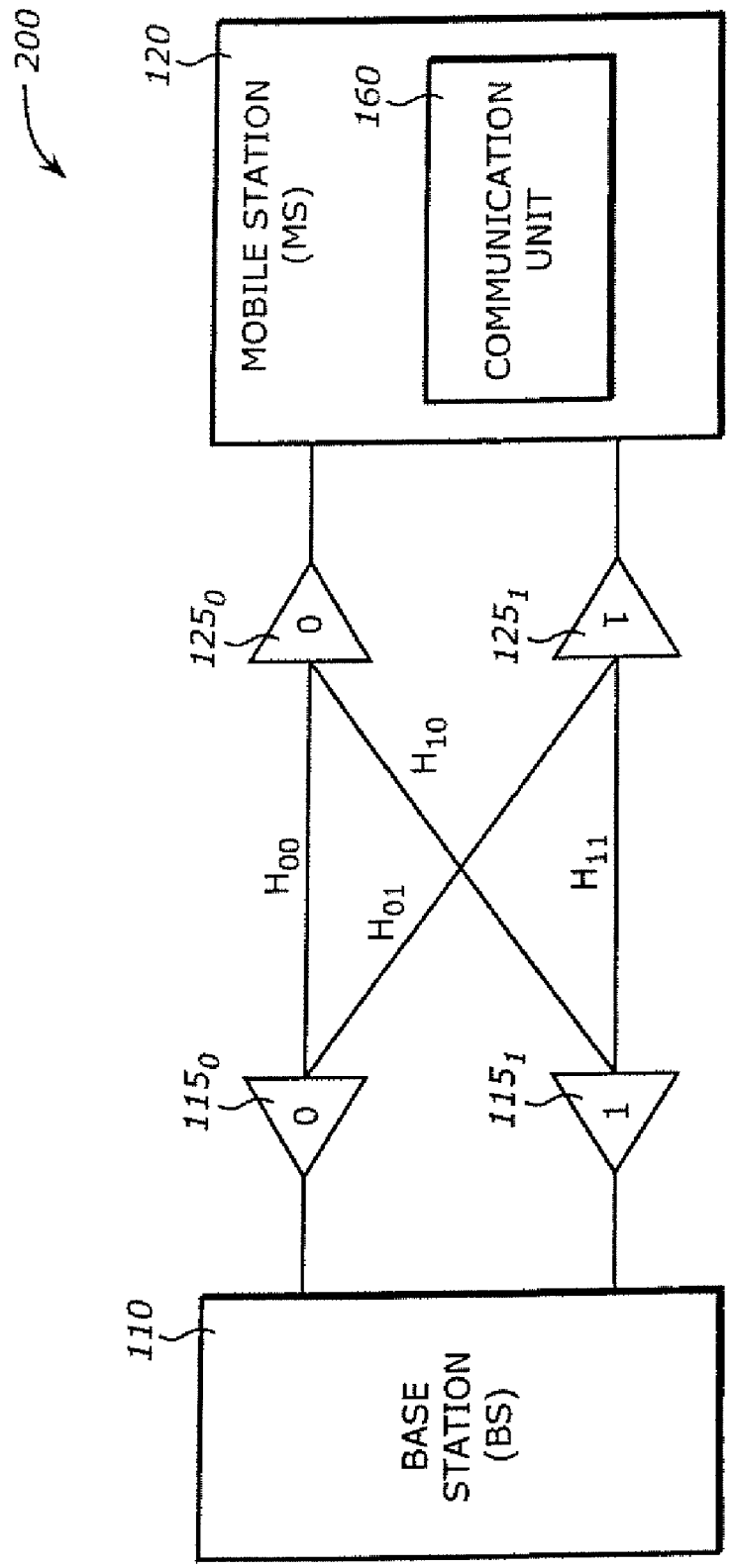
FIG. 2 is a diagram illustrating a 2×2 MIMO OFDMA system according to one embodiment of the invention.

FIG. 2 is a diagram illustrating a 2×2 MIMO OFDMA system 200 according to one embodiment of the invention. The system 200 includes the BS 110 and the MS 120. The system 200 is an illustrative system where each of the BS 110 and MS 120 has two antennae. It is contemplated that each of the BS 110 and MS 120 may have any number of antennae as shown in FIG. 1.

The BS 110 has two antennae $115_0$ and $115_1$ corresponding to BS antenna 0 and 1, respectively. The MS 120 has two antennae $125_0$ and $125_1$ corresponding MS antenna 0 and 1, respectively. The MS 120 contains the communication unit 160 as shown in FIG. 1. For clarity, not all of the elements or components are shown.

The BS 110 may activate both antennae $115_0$ and $115_1$ or one of them depending on a BS operational mode. Similarly, the MS 120 may activate both antennae $125_0$ and $125_1$ or one of them depending on a MS operational mode. It depends on the system operational mode of standard base or non-standard base to decide how many activated antennae to be used in either the BS 110 or the MS 120.

The communication between the BS 110 and the MS 120 may be carried out through four channels: $H_{00}$ between antennae $115_0$ and $125_0$, $H_{01}$ between antennae $115_0$ and $125_1$, $H_{10}$ between antennae $115_1$ and $125_0$, and $H_{11}$ between antennae $115_1$ and $125_1$. Any configuration of the state of the antennae $115_0$, $115_1$, $125_0$ and $125_1$ may be possible.

Table 1 shows all the possible system configurations according to the state of the antennae $115_0$, $115_1$, $125_0$ and $125_1$. The state of the antenna may be active or inactive. An active state corresponds to the state where the antenna is actively receiving or transmitting signals. An inactive state corresponds to the state where the antenna is not actively receiving or transmitting signals or in power-down or power-saving mode.

TABLE 1

| $115_0$ | $115_1$ | $125_0$ | $125_1$ | MIMO system | Channels available |
|---|---|---|---|---|---|
| active | active | active | active | 2 × 2 | $H_{00}, H_{01}, H_{10}, H_{11}$ |
| active | active | active | inactive | 2 × 1 | $H_{00}, H_{10}$ |
| active | active | inactive | active | 2 × 1 | $H_{01}, H_{11}$ |
| active | inactive | active | active | 1 × 2 | $H_{00}, H_{01}$ |
| inactive | active | active | active | 1 × 2 | $H_{10}, H_{11}$ |
| active | inactive | active | inactive | 1 × 1 | $H_{00}$ |
| active | inactive | inactive | active | 1 × 1 | $H_{01}$ |
| inactive | active | active | inactive | 1 × 1 | $H_{10}$ |
| inactive | active | inactive | active | 1 × 1 | $H_{11}$ |

Figure 3:
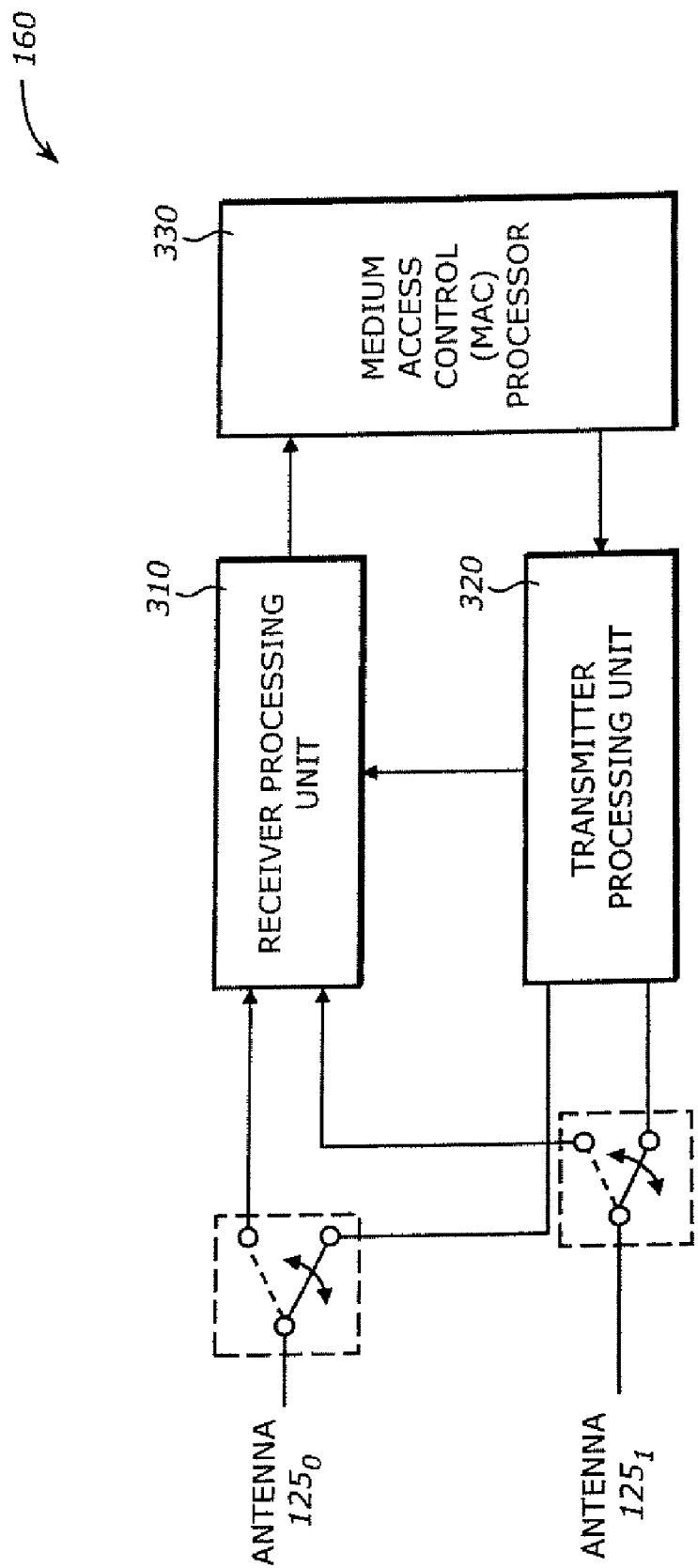
FIG. 3 is a diagram illustrating a communication unit according to one embodiment of the invention.

FIG. 3 is a diagram illustrating the communication unit 160 shown in FIG. 1 according to one embodiment of the invention. The communication unit 160 includes a receiver processing unit 310, a transmitter processing unit 320, and a medium access control (MAC) processor 330. The designation of the terms "receiver" and "transmitter" is mainly for clarity. An element in the receiver processing unit 310 may belong to the transmitter processing unit 320, or vice versa.

The receiver processing unit 310 processes the RF signals received from the antennae $125_0$ and $125_1$ via a downlink (DL) reception path. It provides a decoded signal or a baseband data stream to the MAC processor 330. It also provides a CINR estimate and estimated channel responses to the transmitter processing unit 320.

The transmitter processing unit 320 receives the transmit data, transmitter diversity mode and an allocation base from the MAC processor 330 to generate the RF transmit signals to the antennae $125_0$ and $125_1$ via an uplink (UL) transmission path. The transmitter processing unit 320 provides operational mode control signals to select one of the antennae for transmission via a transmitter diversity technique.

The MAC processor 330 performs data processing on the decoded signal from the receiver processing unit 310 and the transmit data to be sent to the transmitter processing unit 320. It also provides a transmitter diversity mode to select the mode for transmitter diversity. In addition, it also provides an allocation base for the transmitter processing unit 320.

Figure 4:
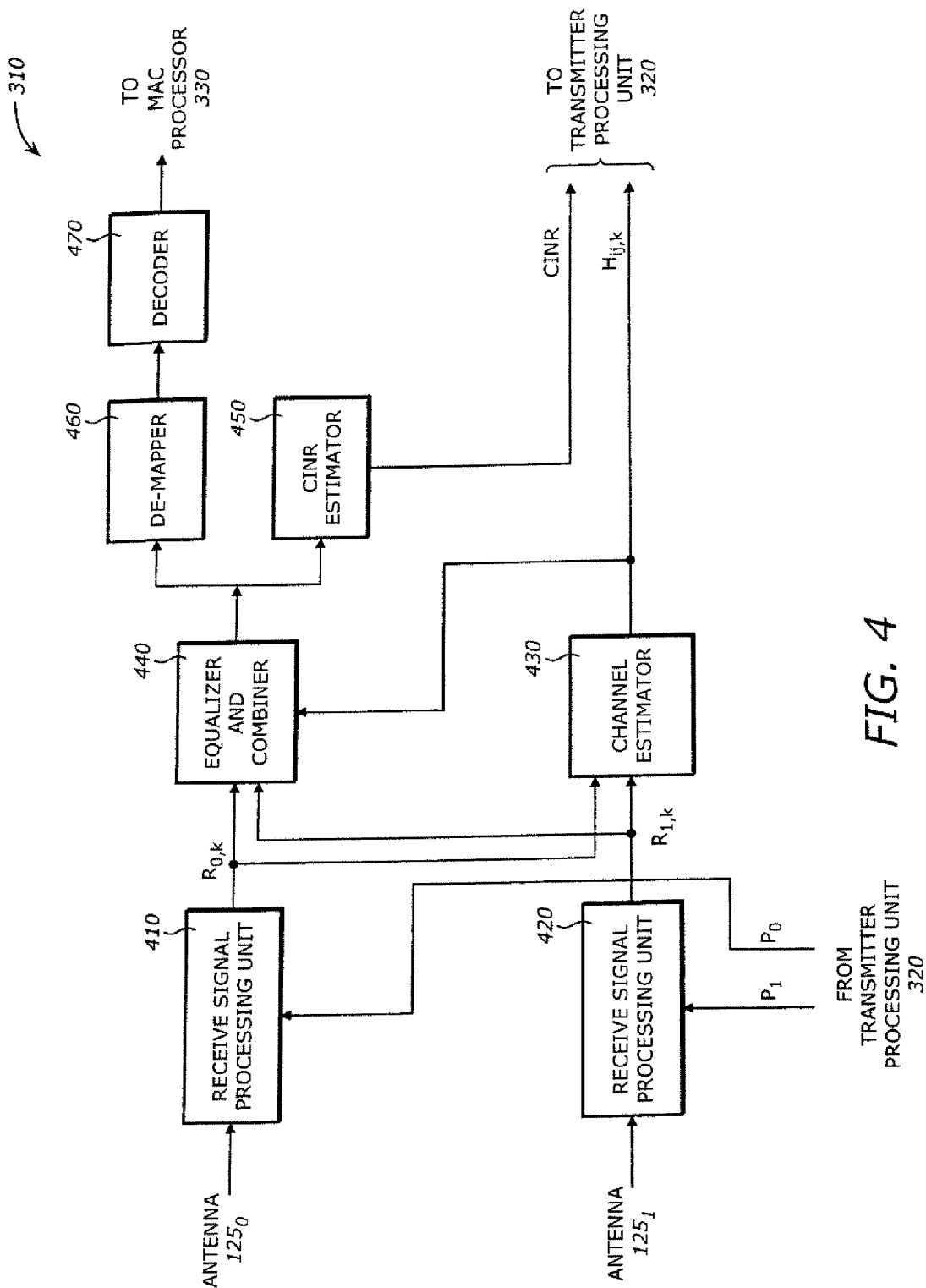
FIG. 4 is a diagram illustrating a receiver processing unit according to one embodiment of the invention.

FIG. 4 is a diagram illustrating the receiver processing unit 310 shown in FIG. 3 according to one embodiment of the invention. The receiver processing unit 310 includes receive signal processing units 410 and 420, a channel estimator 430, an equalizer and combiner 440, a CINR estimator 450, a de-mapper 460, and a decoder 470.

The signal processing units 410 and 420 are connected to the antennae $125_0$ and $125_1$, respectively. They define the antenna paths associated with the antennae $125_0$ and $125_1$. Each of the signal processing units 410 and 420 processes the signal received from the corresponding antenna under control of operational mode control signals $P_0$ and $P_1$ provided by the transmitter processing unit 320. The operational mode control signals may set the antenna $125_0$ and $125_1$ and the signal processing units 410 and 420 in active or inactive mode in any combination. In active mode, the antennae $125_0$ and $125_1$ and the signal processing units 410 and 420 are in a normal operational state. In inactive mode, the antennae $125_0$ and $125_1$ and the signal processing units 410 and 420 may be in power-save or power-down state. The signal processing units 410 and 420 generate frequency domain signals $R_{0,k}$ and $R_{1,k}$, respectively.

The channel estimator 430 estimates channel responses using the processed signals $R_{0,k}$ and $R_{1,k}$ from the signal processing units 410 and 420 according to an operational mode. The channel estimator computes the estimated channel responses according to the following equation:

$$H_{ij,k} = \text{estimate of } H_{ij} \text{ if } H_{ij} \text{ is defined,} \quad (1)$$
$$= 0 \text{ otherwise}$$

where $H_{ij}$ is an estimate of the channel ij associated with antenna i and antenna j; i,j=0,1, and k=−N/2, . . . , N/2−1. N is a positive integer that corresponds to the total number of subcarrier points used in the signal processing units 410 and 420.

For example, suppose a system configuration is a 1×2 MIMO system and the MIMO operational mode corresponds to active BS antenna $115_0$, inactive BS antenna $115_1$, active MS antenna $125_0$, and active MS antenna $125_1$. As shown in Table 1, this operational mode corresponds to two available channels $H_{00}$ and $H_{01}$. In this case, from equation (1) above, the estimated channel responses $H_{00,k}$ and $H_{01,k}$ may have certain valid values, whereas the estimated channel responses $H_{10,k}$ and $H_{11,k}$ have zero values.

The equalizer and combiner 440 generates an equalized and combined signal using the processed signals $R_{0,k}$ and $R_{1,k}$ and the estimated channel responses $H_{ij,k}$'s provided by the channel estimator 430. It is also controlled by the MIMO operational mode. For example, in case of 2×2 MIMO, the equalizer and combiner 440 uses the estimated channel responses $H_{00,k}$, $H_{01,k}$, $H_{10,k}$ and $H_{11,k}$ to equalize and combine the $R_{0,k}$ and $R_{1,k}$ signals. In case of 1×1 MIMO, the equalizer and combiner 440 uses only the estimated channel response $H_{00,k}$ to simply equalize the $R_{0,k}$.

The CINR estimator 450 estimates the CINR from the equalized and combined signal. The estimated CINR is used to generate the operational mode control signals in the transmitter processing unit 320.

The de-mapper 460 de-maps the equalized and combined signal. The decoder 470 decodes the de-mapped signal. The decoded signal is then processed by the MAC processor 330.

Figure 5:
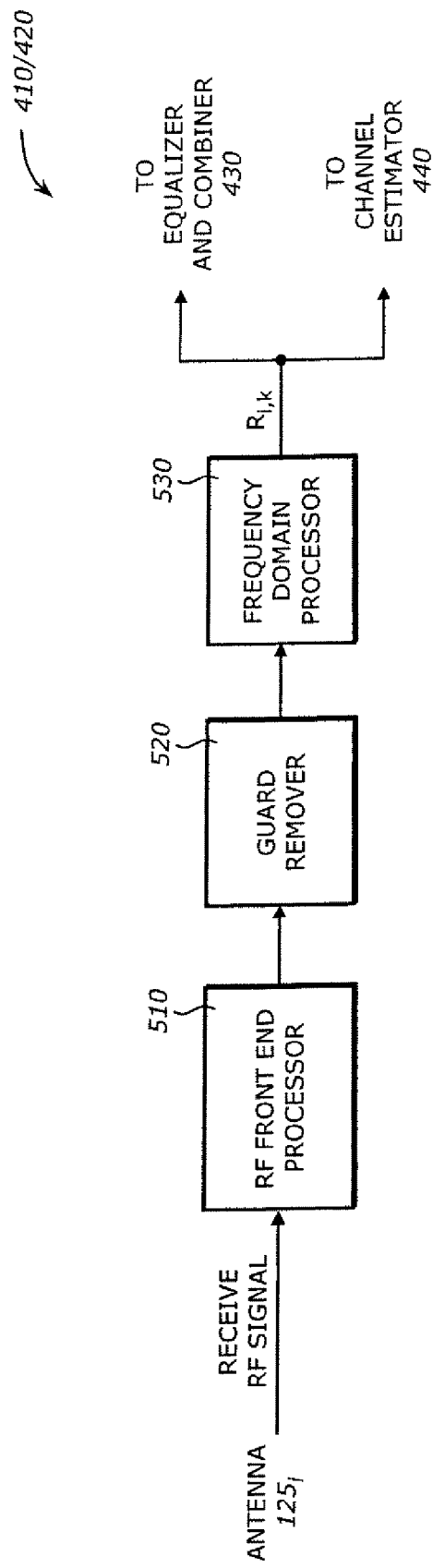
FIG. 5 is a diagram illustrating a receive signal processing unit according to one embodiment of the invention.

FIG. 5 is a diagram illustrating the receive signal processing unit 410/420 shown in FIG. 4 according to one embodiment of the invention. The receive signal processing unit 410/420 includes a RF front end processor 510, a guard remover 520, and a frequency domain processor 530.

The RF front end processor 510 performs RF functions on the corresponding received RF signal. The RF functions may include RF signal conditioning, filtering, down-conversion, and analog-to-digital conversion. The guard remover 520 removes a guard interval from the received signal.

The frequency domain processor 530 converts the received signal to a frequency domain signal having N data points. The frequency domain signal corresponds to the processed signal $R_{i,k}$ where i=0,1. They are sent to the equalizer and combiner 430 and the channel estimator 440. In one embodiment, the frequency domain processor 530 computes the Fast Fourier Transform (FFT) of the corresponding received data stream where the FFT size is N.

Figure 6:
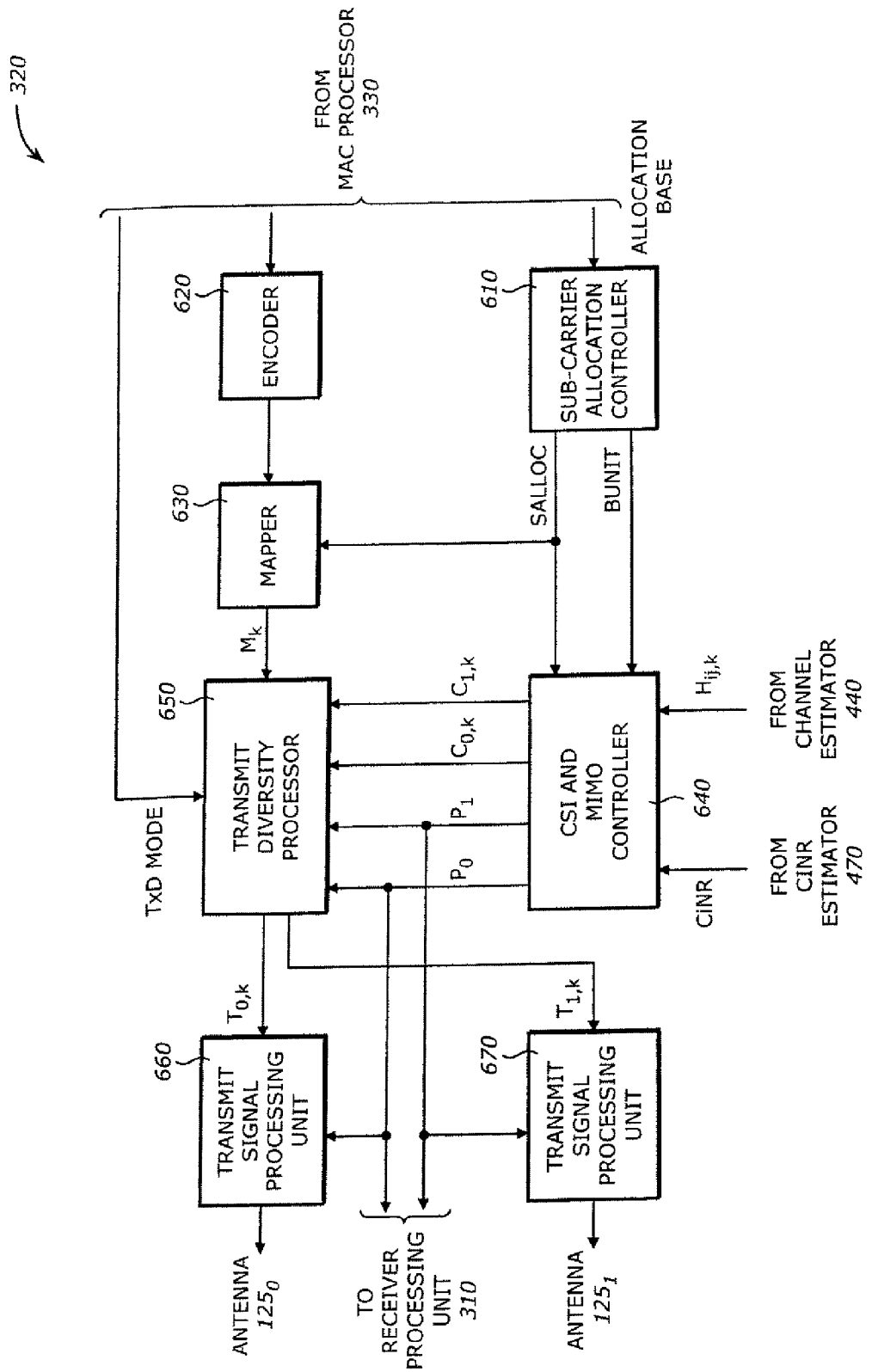
FIG. 6 is a diagram illustrating a transmitter processing unit according to one embodiment of the invention.

FIG. 6 is a diagram illustrating the transmitter processing unit 320 shown in FIG. 3 according to one embodiment of the invention. The transmitter processing unit 320 includes a sub-carrier allocation controller 610, an encoder 620, a mapper 630, a channel status information (CSI) and multiple input multiple output (MIMO) controller 640, a transmit diversity processor 650, and transmit signal processing units 660 and 670.

The sub-carrier allocation controller 610 generates sub-carrier allocation signals using the allocation base from the MAC processor 330. The sub-carrier allocation signals include an allocation information signal Salloc and a diversity unit, Bunit. The allocation information signal contains information on the diversity unit. The diversity unit Bunit is one of a burst, a slot, and an allocation unit. The allocation base is discussed further in FIG. 7.

The encoder 620 encodes transmit data provided by the MAC processor 330. The mapper 630 maps and modulates the encoded transmit data for a sub-carrier index based on the allocation information signal to provide the mapped signal $M_k$, according to the following equation:

$$M_k = \begin{Bmatrix} \text{Mapping \& Modulation,} & \text{if } k \text{ is allocated} \\ 0, & \text{Otherwise} \end{Bmatrix} \quad (2)$$

where k=−N/2, . . . , N/2−1

Figure 8:
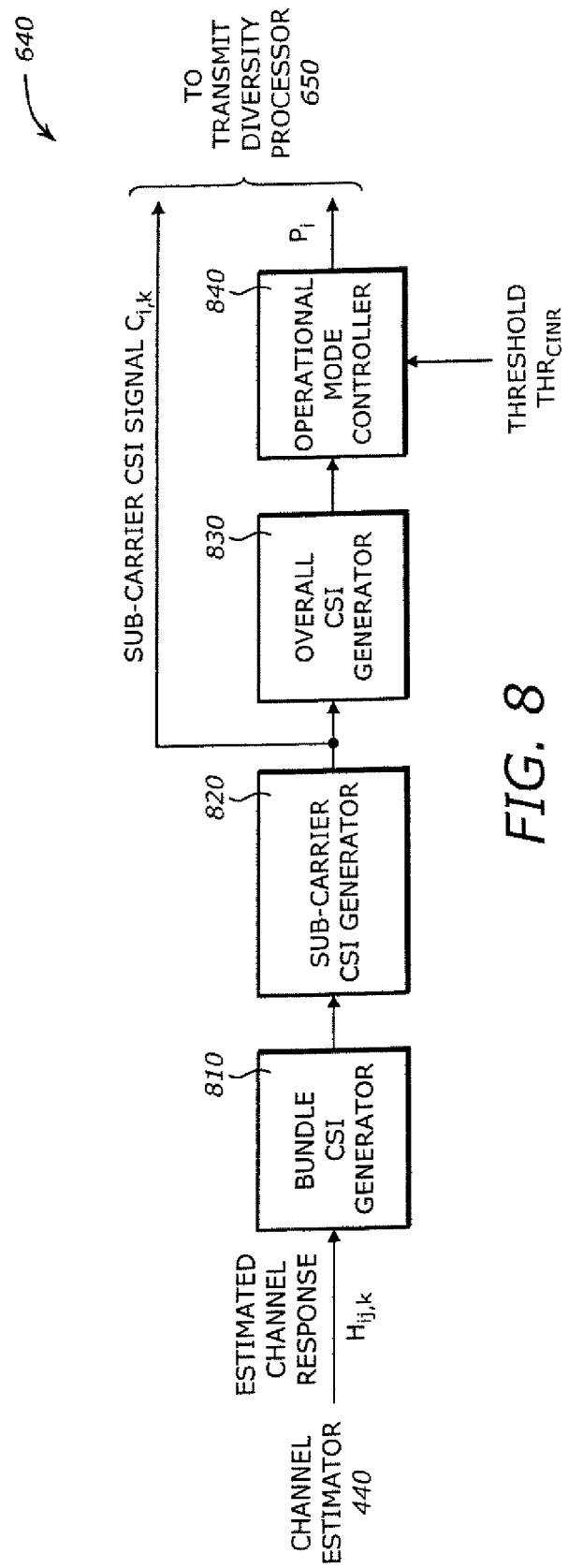
FIG. 8 is a diagram illustrating a CSI and MIMO controller according to one embodiment of the invention.

For a 2×2 MIMO, the CSI and MIMO controller 640 generates sub-carrier CSI signals $C_{0,k}$ and $C_{1,k}$ and operational mode control signals $P_0$ and $P_1$ corresponding the antennae $125_0$ and $125_1$, respectively, using the sub-carrier allocation signals, the estimated channel responses provided by the channel estimator 440, and the estimated CINR provided by the CINR estimator 470. The operational mode control signals $P_0$ and $P_1$ select one of the antenna paths associated with the antennae $125_0$ and $125_1$. The antenna paths correspond to the transmit signal processing units 660 and 670. The operational mode control signals $P_0$ and $P_1$ may assume two values: active or inactive, to indicate whether the antennae $125_0$ or $125_1$ is active or inactive. The details of the computation of the sub-carrier CSI signals $C_{0,k}$ and $C_{1,k}$ and operational mode control signals $P_0$ and $P_1$ are shown in FIG. 8.

The transmitter diversity processor 650 generates transmitter diversity signals as a function of at least the mapped signal $M_k$, the sub-carrier CSI signals, and the operational mode control signals. The transmitter diversity processor 650 generates the transmitter diversity signals according to a transmitter diversity mode corresponding to whether phase alignment is used. The transmitter diversity mode is provided by the MAC processor 330.

For a 2×2 MIMO, the transmitter diversity processor 650 generates a first transmitter diversity signal $T_{0,k}$ and a second transmitter diversity signal $T_{1,k}$ corresponding to the first and second antenna paths, respectively, according to the transmitter diversity mode (T×D). When the T×D indicates that the phase alignment is used, $T_{0,k}$ and $T_{1,k}$ are determined according to the following equations:

$$T_{0,k} = \begin{cases} M_k \times \dfrac{H_{a0,k}^*}{|H_{a0,k}|} & \text{if } (P_0 \text{ Active and } P_1 \text{ Inactive}) \\ M_k \times \dfrac{H_{a0,k}^*}{|H_{a0,k}|} & \begin{array}{l} elseif(C_{0,k} \geq C_{1,k}) \text{ and} \\ (P_0 \text{ Active and } P_1 \text{ Active}) \end{array} \\ 0 & \text{else} \end{cases} \quad (3a)$$

$$\begin{Bmatrix} k = -N/2, \ldots, N/2-1 \\ a = 0 \text{ if } BS \text{ use } ant \ 0 \\ a = 1 \text{ if } BS \text{ use } ant \ 1 \end{Bmatrix}$$

$$T_{1,k} = \begin{cases} M_k \times \dfrac{H^*_{a1,k}}{|H_{a1,k}|} & \text{if } (P_0 \text{ Inactive and } P_1 \text{ Active}) \\ M_k \times \dfrac{H^*_{a1,k}}{|H_{a1,k}|} & \text{elseif}(C_{0,k} < C_{1,k}) \text{ and} \\ & (P_0 \text{ Active and } P_1 \text{ Active}) \\ 0 & \text{else} \end{cases} \quad (3b)$$

$$\begin{cases} k = -N/2, \ldots, N/2-1 \\ a = 0 \text{ if } BS \text{ use } ant\ 0 \\ a = 1 \text{ if } BS \text{ use } ant\ 1 \end{cases}$$

where $k=-N/2, \ldots, N/2-1$; $a=0$ if the first antenna 125$_0$ is used and $a=1$ if the second antenna 125$_1$ is used. $H^*_{ij,k}$ indicate the complex conjugate of $H_{ij,k}$ and $|H_{ij,k}|$ is the magnitude of $H_{ij,k}$. The $H_{ij,k}$'s are determined according to equation (1) above.

When the T×D indicates that the phase alignment is not used, $T_{0,k}$ and $T_{1,k}$ are determined according to the following equations:

$$T_{0,k} = \begin{cases} M_k & \text{if } (P_0 \text{ Active and } P_1 \text{ Inactive}) \\ M_k & \text{elseif}(C_{0,k} \geq C_{1,k}) \text{ and} \\ & (P_0 \text{ Active and } P_1 \text{ Active}) \\ 0 & \text{else} \end{cases} \quad (4a)$$

$$k = -N/2, \ldots, N/2-1$$

$$T_{1,k} = \begin{cases} M_k & \text{if } (P_0 \text{ Inactive and } P_1 \text{ Active}) \\ M_k & \text{elseif}(C_{0,k} < C_{1,k}) \text{ and} \\ & (P_0 \text{ Active and } P_1 \text{ Active}) \\ 0 & \text{else} \end{cases} \quad (4b)$$

$$k = -N/2, \ldots, N/2-1$$

where $k=-N/2, \ldots, N/2-1$.

The transmitter signal processing units 660 and 670 correspond to the antenna paths for transmission. The transmitter signal processing unit 660 is associated with the antenna 125$_0$ and processes a first transmitter diversity signal $T_{0,k}$ of the transmitter diversity signals using the first operational mode control signal $P_0$. The transmitter signal processing unit 670 is associated with the antenna 125$_1$ and processes a second transmitter diversity signal $T_{1,k}$ of the transmitter diversity signals using the second operational mode control signal $P_1$.

Figure 7:
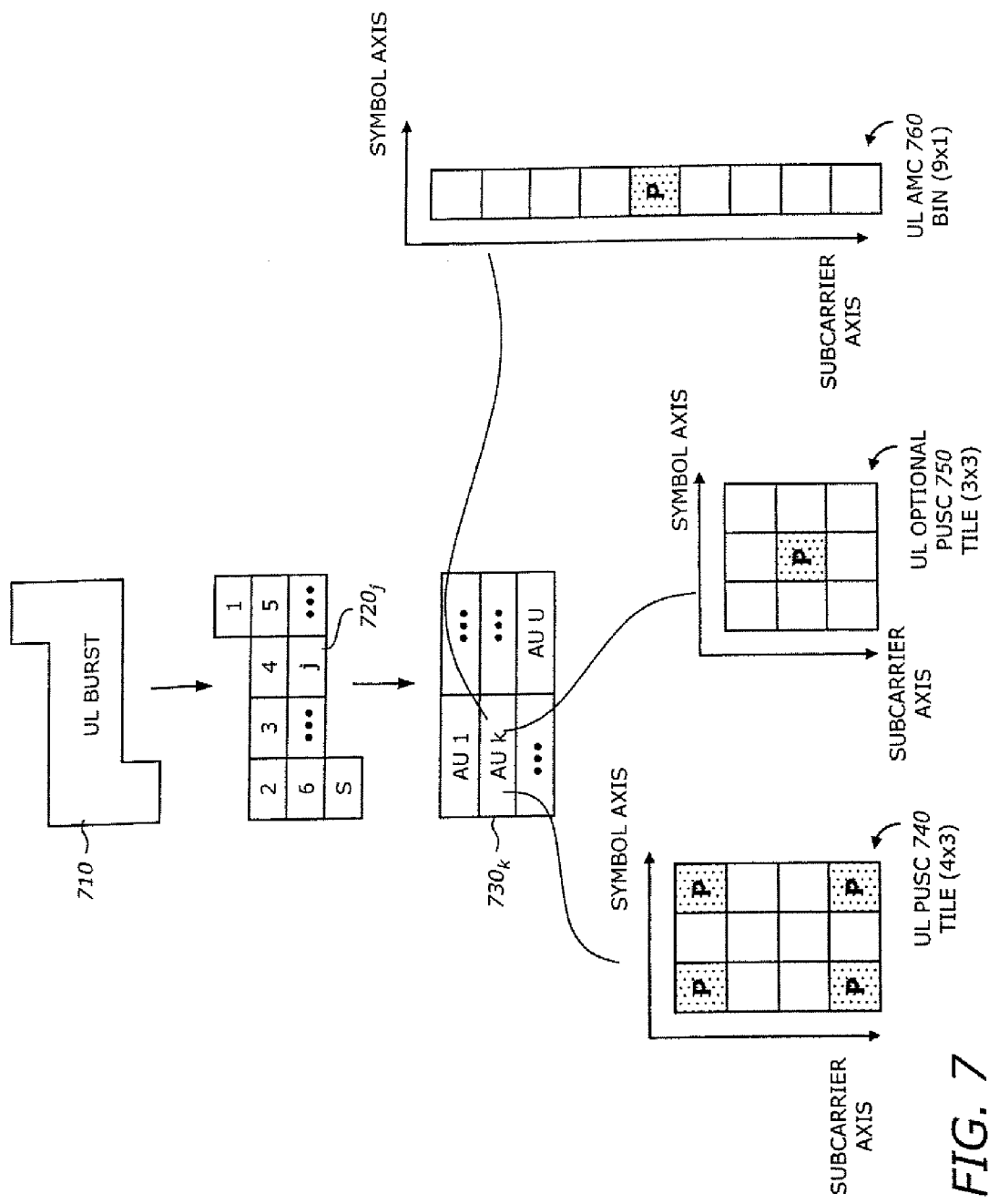
FIG. 7 is a diagram illustrating an UL allocation according to one embodiment of the invention.

FIG. 7 is a diagram illustrating an UL allocation according to one embodiment of the invention. The UL allocation indicates the allocation base used in the system.

According to the IEEE 802.16e standard, a frame structure may have a number of frames. The n-th frame consists of a DL sub-frame, an UL sub-frame, transmit-to-receive transition gap (TTG), and receive-to-transmit transition gap (RTG). The DL sub-frame consists of a preamble, a frame control header (FCH), a DL map, and several DL bursts. The UL sub-frame consists of ranging sub-channels and several UL bursts.

The DL and UL bursts are defined in two dimensional plane defined by a sub-carrier axis (or sub-channel axis) and an OFDMA symbol axis, respectively. The i-th UL burst 710 consists of one or more than one slot 720$_j$'s. Each slot 720$_j$ consists of several Allocation Units 730$_k$'s which have all same structure. There are three different UL Allocation Units as basic allocation units: a partial usage of the sub-channels (PUSC) 740, an optional PUSC 750, and an AMC allocation 760.

The PUSC Allocation Unit is composed of 4 sub-carriers and 3 symbols. There are 4 pilot sub-carriers P's and 8 data sub-carriers in a Tile (4×3). In UL PUSC permutation method, a slot is constructed from 6 Tiles (4×3). The optional PUSC Allocation Unit is composed of 3 sub-carriers and 3 symbols. There are 1 pilot sub-carrier P and 8 data sub-carriers in a Tile (3×3). In UL optional PUSC permutation method, a slot is constructed from 6 Tiles (3×3). The UL AMC Allocation Unit is composed of 9 sub-carriers and 1 symbol. There are 1 pilot sub-carrier P and 8 data sub-carriers in a Bin (9×1). In the UL AMC permutation method, a slot is constructed from 1×6 (sub-carrier axis×symbol axis) Bins (9×1)s, 2×3 Bins (9×1), 3×2 Bins (9×1), or consecutive 6 Bins (9×1) along the allocation region.

FIG. 8 is a diagram illustrating the CSI and MIMO controller 640 shown in FIG. 6 according to one embodiment of the invention. The CSI and MIMO controller 640 includes a bundle CSI generator 810, a sub-carrier CSI channel generator 820, an overall CSI generator 830, and an operational mode controller 840.

The bundle CSI generator 810 generates bundle CSI signals based on a bundle b using the estimated channel responses. The bundle CSI generator 810 generates a first bundle CSI signal $BC_{0,b}$ and a second bundle CSI signal $BC_{1,b}$ corresponding to first and second antenna paths associated with first and second antennae, respectively, according to the following equations:

$$BC_{0,b} = \frac{1}{L}\sum_{l=1}^{L}(|H_{00,x_b(l)}|^2 + |H_{10,x_b(l)}|^2), b=1,\ldots,B, x_b(l) \subset X_b \quad (5a)$$

$$BC_{1,b} = \frac{1}{L}\sum_{l=1}^{L}(|H_{01,x_b(l)}|^2 + |H_{11,x_b(l)}|^2), b=1,\ldots,B, x_b(l) \subset X_b \quad (5b)$$

where $H_{00,xb(l)}$, $H_{01,xb(l)}$, $H_{10,xb(l)}$, and $H_{11,xb(l)}$ correspond to the estimated channel responses, and $x_b=\{x_b(1),\ldots,x_b(l),\ldots,x_b(L)\}$ is a set of sub-carrier indices, $x_b(l)$ is the l-th element of the b-th bundle and has an integer value representing a sub-carrier index greater than or equal to $-N/2$ and less than $N/2$, N being a positive integer; L is number of elements of the bundle b; and B represents a total number of bundles and is provided by the sub-carrier allocation signals.

The sub-carrier CSI generator 820 generates the sub-carrier CSI signals $C_{0,k}$ and $C_{1,k}$ using the bundle CSI signals. The sub-carrier CSI generator 820 generates a first sub-carrier CSI signal $C_{0,k}$ and a second sub-carrier CSI signal $C_{1,k}$ corresponding to the first and second antenna paths, respectively, according to the following equations:

$$C_{0,k} = \begin{cases} 0, & \text{initialization} \\ BC_{0,b} & \text{if } k \subset X_b \end{cases}, k=-N/2,\ldots,N/2-1, 1 \leq b \leq B \quad (6a)$$

$$C_{1,k} = \begin{cases} 0, & \text{initialization} \\ BC_{1,b} & \text{if } k \subset X_b \end{cases}, k=-N/2,\ldots,N/2-1, 1 \leq b \leq B \quad (6b)$$

The overall CSI generator 830 generates overall CSI signals using the sub-carrier CSI signals $C_{0,k}$ and $C_{1,k}$. The overall CSI generator 830 generates a first overall CSI signal $PC_0$ and a second overall CSI signal $PC_1$ corresponding to the first and second antenna paths, respectively, according to the following equations:

$$PC_0 = \sum_k C_{0,k}, k = -N/2, \ldots, N/2 - 1 \qquad (7a)$$

$$PC_1 = \sum_k C_{1,k}, k = -N/2, \ldots, N/2 - 1 \qquad (7b)$$

The operational mode controller 840 generates the operational mode control signals using the overall CSI signals and a threshold $THR_{CINR}$. The threshold $THR_{CINR}$ may be selected according to the channel state or the type of modulation. The operational mode generator 840 generates a first operational mode signal $P_0$ and a second operational mode signal $P_1$ corresponding to the first and second antenna paths, respectively, according to the following equations:

$$P_0 = \begin{cases} \text{Active,} & \text{if } CINR < THR_{CINR} \\ \text{Active,} & \text{elseif } CINR \geq THR_{CINR} \text{ and } PC_0 \geq PC_1 \\ \text{Inactive,} & \text{elseif } CINR \geq THR_{CINR} \text{ and } PC_0 < PC_1 \end{cases} \qquad (8a)$$

$$P_1 = \begin{cases} \text{Active,} & \text{if } CINR < THR_{CINR} \\ \text{Inactive,} & \text{elseif } CINR > THR_{CINR} \text{ and } PC_0 \geq PC_1 \\ \text{Active,} & \text{elseif } CINR \geq THR_{CINR} \text{ and } PC_0 < PC_1 \end{cases} \qquad (8b)$$

where CINR is the estimated CINR provided by the CINR estimator 470.

The operational mode control signals $P_0$ and $P_1$ may be used to adjust the number of antenna paths using the estimated CINR and CSI. Consequently, the power consumption of the communication unit 160 may be reduced or minimized. This is especially useful for hand-held mobile wireless devices.

Figure 9:
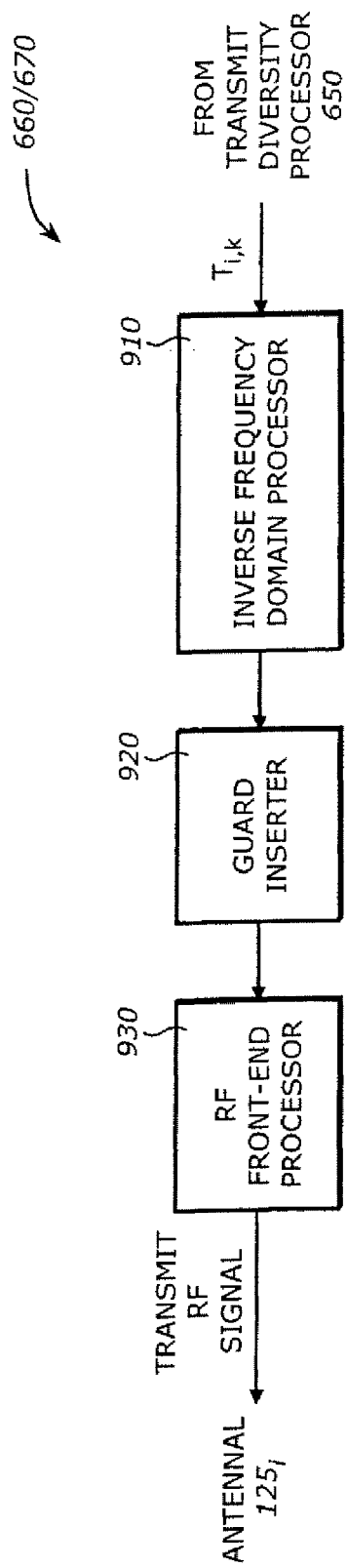
FIG. 9 is a diagram illustrating a transmit signal processing unit according to one embodiment of the invention.

FIG. 9 is a diagram illustrating the transmit signal processing unit 660/670 according to one embodiment of the invention. The transmit signal processing unit 660/670 includes an inverse frequency domain processor 910, a guard inserter 920, and a RF front end processor 930.

The inverse frequency domain processor 910 converts one of the first and second transmitter diversity signals to a transmit signal. In one embodiment, the inverse frequency domain processor 910 computes the inverse FFT of the transmit diversity signal using an inverse FFT size of N. The guard inserter 920 inserts a guard band to the transmit signal.

The RF front end processor 930 performs RF functions on the transmit signal. The RF functions may include digital-to-analog conversion, RF signal condition, filtering, and up-conversion.

As discussed above, the transmitter diversity scheme used in the present invention may be applied to any systems without changing the standard specification (e.g., IEEE 802.16e). In other words, any receiver conforming to the standard may receive, de-map, demodulate, and decode the transmit signal. In addition, the communication unit 160 is not limited to two antennae. The above discussion may be extended to any number of antennae. The structure of the communication unit 160 may be modified accordingly.

Elements of embodiments of the invention may be implemented by hardware, firmware, software or any combination thereof. The term hardware generally refers to an element having a physical structure such as electronic, electromagnetic, optical, electro-optical, mechanical, electro-mechanical parts, components, or devices, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), an erasable programmable ROM (EPROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described above. The machine accessible medium may also include program code embedded therein. The program code may include machine readable code to perform the operations described above. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A computer program product comprising:
   a non-transitory processor-readable medium comprising code for:
   processing signals received from a plurality of antennae under control by operational mode control signals, the operational mode control signals selecting one of a plurality of antenna paths associated with the plurality of antennae;
   estimating channel responses using the processed signals according to an operational mode;
   generating an equalized and combined signal using the processed signals and the estimated channel responses; and
   estimating Carrier to Interference Noise Ratio (CINR) from the equalized and combined signal, the estimated CINR being used to generate the operational mode control signals.

2. The computer program product of claim 1 wherein the code for processing the signals comprises code for:
   performing radio frequency (RF) functions on one of the signals;
   removing a guard band from the one of the signals; and
   converting the one of the signals to a frequency domain signal having N data points, the frequency domain signal corresponding to the processed signal.

3. The computer program product of claim 2 wherein the code for estimating channel responses comprises code for computing the estimated channel responses according to $$H_{ij,k} = \text{estimate of } H_{ij} \text{ if } H_{ij} \text{ is defined,}$$
$$= 0 \text{ otherwise}$$

wherein $H_{ij}$ is an estimate of channel ij associated with antenna i and antenna j; and $k=-N/2, \ldots, N/2-1$.

4. The computer program product of claim 1 further comprising code for:
   de-mapping the equalized and combined signal; and
   decoding the de-mapped signal.

5. The computer program product of claim 4 further comprising code for:
   processing the decoded signal using a Medium Access Control (MAC) processor.

6. The computer program product of claim 1 wherein the signals are compatible with a multi input multi output (MIMO) orthogonal frequency division multiplexing access (OFDMA) standard.

7. An apparatus comprising:
   means for processing signals received from a plurality of antennae under control by operational mode control signals, the operational mode control signals selecting one of a plurality of antenna paths associated with the plurality of antennae;
   means for estimating channel responses using the processed signals according to an operational mode;
   means for generating an equalized and combined signal using the processed signals and the estimated channel responses; and
   means for estimating Carrier to Interference Noise Ratio (CINR) from the equalized and combined signal, the estimated CINR being used to generate the operational mode control signals.

8. The apparatus of claim 7 wherein the means for processing the signals comprises:
   means for performing radio frequency (RF) functions on one of the signals;
   means for removing a guard band from the one of the signals; and
   means for converting the one of the signals to a frequency domain signal having N data points, the frequency domain signal corresponding to the processed signal.

9. The apparatus of claim 8 wherein the means for estimating channel responses comprises means for computing the estimated channel responses according to $$H_{ij,k} = \text{estimate of } H_{ij} \text{ if } H_{ij} \text{ is defined,}$$
$$= 0 \text{ otherwise}$$

wherein $H_{ij}$ is an estimate of channel ij associated with antenna i and antenna j; and $k=-N/2, \ldots, N/2-1$.

10. The apparatus of claim 7 further comprising:
    means for de-mapping the equalized and combined signal; and
    means for decoding the de-mapped signal.

11. The apparatus of claim 10 further comprising:
    means for processing the decoded signal using a Medium Access Control (MAC) processor.

12. The apparatus of claim 7 wherein the signals are compatible with a multi input multi output (MIMO) orthogonal frequency division multiplexing access (OFDMA) standard.

13. A computer program product comprising:
    a non-transitory processor-readable medium comprising code for:
    generating sub-carrier allocation signals using an allocation base;
    generating sub-carrier channel status information (CSI) signals and operational mode control signals using the sub-carrier allocation signals, estimated channel responses provided by a channel estimator, and an estimated Carrier to Interference Noise Ratio (CINR) provided by an CINR estimator, the operational mode control signals selecting one of a plurality of antenna paths associated with a plurality of antennae; and
    generating transmitter diversity signals as a function of at least a mapped signal $M_k$, the sub-carrier CSI signals, and the operational mode control signals.

14. The computer program product of claim 13 wherein the allocation base corresponds to one of a partial usage of sub-channels (PUSC), an optional PUSC, an AMC, and allocation regions for corresponding bursts.

15. The computer program product of claim 14 wherein the sub-carrier allocation signals include an allocation information signal and a diversity unit, the allocation information signal containing information on the diversity unit, the diversity unit being one of a burst, a slot, and an allocation unit.

16. The computer program product of claim 13 wherein the code for generating sub-carrier CSI signals and operational mode control signals comprise code for:
    generating bundle CSI signals based on a bundle b using the estimated channel responses; and
    generating the sub-carrier CSI signals using the bundle CSI signals.

17. The computer program product of claim 16 wherein the code for generating the bundle CSI signals comprises code for generating a first bundle CSI signal $BC_{0,b}$ and a second bundle CSI signal $BC_{1,b}$ corresponding to first and second antenna paths associated with first and second antennae, respectively, according to:

$$BC_{0,b} = \frac{1}{L}\sum_{l=1}^{L}(|H_{00,x_b(l)}|^2 + |H_{10,x_b(l)}|^2), b = 1, \ldots, B, x_b(l) \subset X_b$$

$$BC_{1,b} = \frac{1}{L}\sum_{l=1}^{L}(|H_{01,x_b(l)}|^2 + |H_{11,x_b(l)}|^2), b = 1, \ldots, B, x_b(l) \subset X_b$$

wherein $H_{00,xb(l)}$, $H_{01,xb(l)}$, $H_{10,xb(l)}$, and $H_{11,xb(l)}$ correspond to the estimated channel responses, and $x_b = \{x_b(1), \ldots, x_b(l), \ldots, x_b(L)\}$ is a set of sub-carrier indices, $x_b(l)$ is the 1-th element of the b-th bundle and has an integer value representing a sub-carrier index greater than or equal to $-N/2$ and less than $N/2$, N being a positive integer, L is number of elements of the bundle b; and B represents a total number of bundles and is provided by the sub-carrier allocation signals.

18. The computer program product of claim 17 wherein the code for generating the sub-carrier CSI signals comprises code for generating a first sub-carrier CSI signal $C_{0,k}$ and a second sub-carrier CSI signal $C_{1,k}$ corresponding to the first and second antenna paths, respectively, according to:

$$C_{0,k} = \begin{cases} 0, & \text{initialization} \\ BC_{0,b} & \text{if } k \subset X_b, \end{cases}, k = -N/2, \ldots, N/2-1, 1 \leq b \leq B$$

$$C_{1,k} = \begin{cases} 0, & \text{initialization} \\ BC_{1,b} & \text{if } k \subset X_b, \end{cases}, k = -N/2, \ldots, N/2-1, 1 \leq b \leq B.$$

19. The computer program product of claim 18 wherein the code for generating the sub-carrier CSI signals and the operational mode control signals further comprises code for:

generating overall CSI signals using the sub-carrier CSI signals; and generating the operational mode control signals using the overall CSI signals and a threshold.

20. The computer program product of claim 19 wherein the code for generating overall CSI signals comprises code for generating a first overall CSI signal $PC_0$ and a second overall CSI signal $PC_1$ corresponding to the first and second antenna paths, respectively, according to:

$$PC_0 = \sum_k C_{0,k}, k = -N/2, \ldots, N/2-1$$

$$PC_1 = \sum_k C_{1,k}, k = -N/2, \ldots, N/2-1.$$

21. The computer program product of claim 20 wherein the code for generating the operational mode control signals comprises code for generating a first operational mode signal $P_0$ and a second operational mode signal $P_1$ corresponding to the first and second antenna paths, respectively, according to:

$$P_0 = \begin{cases} \text{Active,} & \text{if } CINR < THR_{CINR} \\ \text{Active,} & \text{elseif } CINR \geq THR_{CINR} \text{ and } PC_0 \geq PC_1 \\ \text{Inactive,} & \text{elseif } CINR \geq THR_{CINR} \text{ and } PC_0 < PC_1 \end{cases}$$

$$P_1 = \begin{cases} \text{Active,} & \text{if } CINR < THR_{CINR} \\ \text{Inactive,} & \text{elseif } CINR \geq THR_{CINR} \text{ and } PC_0 \geq PC_1 \\ \text{Active,} & \text{elseif } CINR \geq THR_{CINR} \text{ and } PC_0 < PC_1 \end{cases}$$

wherein CINR is the estimated CINR provided by the CINR estimator.

22. The computer program product of claim 21 wherein the code for generating transmitter diversity signals comprises code for generating the transmitter diversity signals according to a transmitter diversity mode corresponding to whether phase alignment is used, the transmitter diversity mode being provided by a Medium Access Control (MAC) processor.

23. The computer program product of claim 22 wherein the code for generating transmitter diversity signals comprises code for generating a first transmitter diversity signal $T_{0,k}$ and a second transmitter diversity signal $T_{1,k}$ corresponding to the first and second antenna paths, respectively, when the transmitter diversity mode indicates that the phase alignment is used, according to:

$$T_{0,k} = \begin{cases} M_k \times \frac{H^*_{a0,k}}{|H_{a0,k}|} & \text{if } (P_0 \text{ Active and } P_1 \text{ Inactive}) \\ M_k \times \frac{H^*_{a0,k}}{|H_{a0,k}|} & \text{elseif } (C_{0,k} \geq C_{1,k}) \text{ and } (P_0 \text{ Active and } P_1 \text{ Active}) \\ 0 & \text{else} \end{cases},$$

$$\begin{cases} k = -N/2, \ldots, N/2-1 \\ a = 0 \text{ if } BS \text{ use } ant\ 0 \\ a = 1 \text{ if } BS \text{ use } ant\ 1 \end{cases}$$

$$T_{1,k} = \begin{cases} M_k \times \frac{H^*_{a1,k}}{|H_{a1,k}|} & \text{if } (P_0 \text{ Inactive and } P_1 \text{ Active}) \\ M_k \times \frac{H^*_{a1,k}}{|H_{a1,k}|} & \text{elseif } (C_{0,k} < C_{1,k}) \text{ and } (P_0 \text{ Active and } P_1 \text{ Active}) \\ 0 & \text{else} \end{cases},$$

$$\begin{cases} k = -N/2, \ldots, N/2-1 \\ a = 0 \text{ if } BS \text{ use } ant\ 0 \\ a = 1 \text{ if } BS \text{ use } ant\ 1 \end{cases}$$

wherein $k=-N/2, \ldots, N/2-1$; $a=0$ if the first antenna is used and $a=1$ if the second antenna is used.

24. The computer program product of claim 22 wherein the code for generating transmitter diversity signals comprises code for generating a first transmitter diversity signal $T_{0,k}$ and a second transmitter diversity signal $T_{1,k}$ corresponding to the first and second antenna paths, respectively, when the transmitter diversity mode indicates that the phase alignment is not used, according to:

$$T_{0,k} = \begin{cases} M_k & \text{if } (P_0 \text{ Active and } P_1 \text{ Inactive}) \\ M_k & \text{elseif } (C_{0,k} \geq C_{1,k}) \text{ and } (P_0 \text{ Active and } P_1 \text{ Active}) \\ 0 & \text{else} \end{cases},$$

-continued $$T_{1,k} = \begin{cases} M_k & \text{if } (P_0 \text{ Inactive and } P_1 \text{ Active}) \\ M_k & \text{elseif } (C_{0,k} < C_{1,k}) \text{ and } (P_0 \text{ Active and } P_1 \text{ Active}) \\ 0 & \text{else} \end{cases},$$

$$k = -N/2, \ldots, N/2-1$$

wherein k=−N/2, . . . , N/2−1.

25. The computer program product of claim 13 further comprises code for:
encoding transmit data provided by a Medium Access Control (MAC) processor; and
mapping and modulating the encoded transmit data for a sub-carrier index based on the allocation information signal, according to:

$$M_k = \begin{cases} \text{Mapping \& Modulation,} & \text{if } k \text{ is allocated} \\ 0, & \text{Else} \end{cases} \quad k = -N/2, \ldots, N/2-1$$

wherein k=−N/2, . . . , N/2−1.

26. The computer program product of claim 21 wherein the code for generating the transmit signal comprises code for:
processing a first transmitter diversity signal of the transmitter diversity signals using the first operational mode control signal; and
processing a second transmitter diversity signal of the transmitter diversity signals using the second operational mode control signal.

27. The computer program product of claim 26 wherein the code for processing one of the first and second transmitter diversity signals comprises:
converting one of the first and second transmitter diversity signals to the transmit signal;
inserting a guard band to the transmit signal; and
performing RF functions on the transmit signal.

28. The computer program product of claim 13 further comprises code for:
encoding transmit data provided by a Medium Access Control (MAC) processor; and
mapping and modulating the encoded transmit data for a sub-carrier index based on the allocation information signal to provide the mapped signal $M_k$, according to:

$$M_k = \begin{cases} \text{Mapping \& Modulation,} & \text{if } k \text{ is allocated} \\ 0, & \text{Else} \end{cases} \quad k = -N/2, \ldots, N/2-1$$

wherein k=−N/2, . . . , N/2−1.

29. The computer program product of claim 13 wherein the transmitter diversity signals are compatible with a multi input multi output (MIMO) orthogonal frequency division multiplexing access (OFDMA) standard.

30. An apparatus comprising:
means for generating sub-carrier allocation signals using an allocation base;
means for generating sub-carrier channel status information (CSI) signals and operational mode control signals using the sub-carrier allocation signals, estimated channel responses provided by a channel estimator, and an estimated Carrier to Interference Noise Ratio (CINR) provided by an CINR estimator, the operational mode control signals selecting one of a plurality of antenna paths associated with a plurality of antennae; and
means for generating transmitter diversity signals as a function of at least a mapped signal $M_k$, the sub-carrier CSI signals, and the operational mode control signals.

31. The apparatus of claim 30 wherein the allocation base corresponds to one of a partial usage of sub-channels (PUSC), an optional PUSC, an AMC, and allocation regions for corresponding bursts.

32. The apparatus of claim 31 wherein the sub-carrier allocation signals include an allocation information signal and a diversity unit, the allocation information signal containing information on the diversity unit, the diversity unit being one of a burst, a slot, and an allocation unit.

33. The apparatus of claim 30 wherein the means for generating sub-carrier CSI signals and operational mode control signals comprises:
means for generating bundle CSI signals based on a bundle b using the estimated channel responses; and
means for generating the sub-carrier CSI signals using the bundle CSI signals.

34. The apparatus of claim 33 wherein the means for generating the bundle CSI signals comprises means for generating a first bundle CSI signal $BC_{0,b}$ and a second bundle CSI signal $BC_{1,b}$ corresponding to first and second antenna paths associated with first and second antennae, respectively, according to:

$$BC_{0,b} = \frac{1}{L}\sum_{l=1}^{L}(|H_{00,x_b(l)}|^2 + |H_{10,x_b(l)}|^2), b = 1, \ldots, B, x_b(l) \subset X_b$$

$$BC_{1,b} = \frac{1}{L}\sum_{l=1}^{L}(|H_{01,x_b(l)}|^2 + |H_{11,x_b(l)}|^2), b = 1, \ldots, B, x_b(l) \subset X_b$$

wherein $H_{00,xb(l)}$, $H_{01,xb(l)}$, $H_{10,xb(l)}$, and $H_{11,xb(l)}$ correspond to the estimated channel responses, and $x_b=\{x_b(1), \ldots, x_b(l), \ldots, x_b(L)\}$ is a set of sub-carrier indices, $x_b(l)$ is the l-th element of the b-th bundle and has an integer value representing a sub-carrier index greater than or equal to −N/2 and less than N/2, N being a positive integer, L is number of elements of the bundle b; and B represents a total number of bundles and is provided by the sub-carrier allocation signals.

35. The apparatus of claim 34 wherein the means for generating the sub-carrier CSI signals comprises means for generating a first sub-carrier CSI signal $C_{0,k}$ and a second sub-carrier CSI signal $C_{1,k}$ corresponding to the first and second antenna paths, respectively, according to:

$$C_{0,k} = \begin{cases} 0, & \text{initialization} \\ BC_{0,b} & \text{if } k \subset X_b, \end{cases}, k = -N/2, \ldots, N/2-1, 1 \le b \le B$$

$$C_{1,k} = \begin{cases} 0, & \text{initialization} \\ BC_{1,b} & \text{if } k \subset X_b, \end{cases}, k = -N/2, \ldots, N/2-1, 1 \le b \le B.$$

36. The apparatus of claim 35 wherein the means for generating the sub-carrier CSI signals and the operational mode control signals further comprises:
means for generating overall CSI signals using the sub-carrier CSI signals; and means for generating the operational mode control signals using the overall CSI signals and a threshold.

37. The apparatus of claim 36 wherein the means for generating overall CSI signals comprises means for generating a first overall CSI signal $PC_0$ and a second overall CSI signal $PC_1$ corresponding to the first and second antenna paths, respectively, according to:

$$PC_0 = \sum_k C_{0,k}, k = -N/2, \ldots, N/2-1$$

$$PC_1 = \sum_k C_{1,k}, k = -N/2, \ldots, N/2-1.$$

38. The apparatus of claim 37 wherein the means for generating the operational mode control signals comprises means for generating a first operational mode signal $P_0$ and a second operational mode signal $P_1$ corresponding to the first and second antenna paths, respectively, according to:

$$P_0 = \begin{cases} \text{Active,} & \text{if } CINR < THR_{CINR} \\ \text{Active,} & \text{elseif } CINR \geq THR_{CINR} \text{ and } PC_0 \geq PC_1 \\ \text{Inactive,} & \text{elseif } CINR \geq THR_{CINR} \text{ and } PC_0 < PC_1 \end{cases}$$

$$P_1 = \begin{cases} \text{Active,} & \text{if } CINR < THR_{CINR} \\ \text{Inactive,} & \text{elseif } CINR \geq THR_{CINR} \text{ and } PC_0 \geq PC_1 \\ \text{Active,} & \text{elseif } CINR \geq THR_{CINR} \text{ and } PC_0 < PC_1 \end{cases}$$

wherein CINR is the estimated CINR provided by the CINR estimator.

39. The apparatus of claim 38 wherein the means for generating transmitter diversity signals comprises means for generating the transmitter diversity signals according to a transmitter diversity mode corresponding to whether phase alignment is used, the transmitter diversity mode being provided by a Medium Access Control (MAC) processor.

40. The apparatus of claim 39 wherein the means for generating transmitter diversity signals comprises means for generating a first transmitter diversity signal $T_{0,k}$ and a second transmitter diversity signal $T_{1,k}$ corresponding to the first and second antenna paths, respectively, when the transmitter diversity mode indicates that the phase alignment is used, according to:

$$T_{0,k} =$$

$$\begin{cases} M_k \times \dfrac{H^*_{a0,k}}{|H_{a0,k}|} & \text{if } (P_0 \text{ Active and } P_1 \text{ Inactive}) \\ M_k \times \dfrac{H^*_{a0,k}}{|H_{a0,k}|} & \text{elseif } (C_{0,k} \geq C_{1,k}) \text{ and } (P_0 \text{ Active and } P_1 \text{ Active}) \\ 0 & \text{else} \end{cases},$$

$$\begin{cases} k = -N/2, \ldots, N/2-1 \\ a = 0 \text{ if } BS \text{ use } ant\ 0 \\ a = 1 \text{ if } BS \text{ use } ant\ 1 \end{cases}$$

$$T_{1,k} =$$

$$\begin{cases} M_k \times \dfrac{H^*_{a1,k}}{|H_{a1,k}|} & \text{if } (P_0 \text{ Inactive and } P_1 \text{ Active}) \\ M_k \times \dfrac{H^*_{a1,k}}{|H_{a1,k}|} & \text{elseif } (C_{0,k} < C_{1,k}) \text{ and } (P_0 \text{ Active and } P_1 \text{ Active}) \\ 0 & \text{else} \end{cases},$$

$$\begin{cases} k = -N/2, \ldots, N/2-1 \\ a = 0 \text{ if } BS \text{ use } ant\ 0 \\ a = 1 \text{ if } BS \text{ use } ant\ 1 \end{cases}$$

wherein $k=-N/2, \ldots, N/2-1$; $a=0$ if the first antenna is used and $a=1$ if the second antenna is used.

41. The apparatus of claim 39 wherein the means for generating transmitter diversity signals comprises means for generating a first transmitter diversity signal $T_{0,k}$ and a second transmitter diversity signal $T_{1,k}$ corresponding to the first and second antenna paths, respectively, when the transmitter diversity mode indicates that the phase alignment is not used, according to:

$$T_{0,k} = \begin{cases} M_k & \text{if } (P_0 \text{ Active and } P_1 \text{ Inactive}) \\ M_k & \text{elseif } (C_{0,k} \geq C_{1,k}) \text{ and } (P_0 \text{ Active and } P_1 \text{ Active}) \\ 0 & \text{else} \end{cases},$$

$$k = -N/2, \ldots, N/2-1$$

$$T_{1,k} = \begin{cases} M_k & \text{if } (P_0 \text{ Inactive and } P_1 \text{ Active}) \\ M_k & \text{elseif } (C_{0,k} < C_{1,k}) \text{ and } (P_0 \text{ Active and } P_1 \text{ Active}) \\ 0 & \text{else} \end{cases},$$

$$k = -N/2, \ldots, N/2-1$$

wherein $k=-N/2, \ldots, N/2-1$.

42. The apparatus of claim 30 further comprises:
means for encoding transmit data provided by a Medium Access Control (MAC) processor; and
means for mapping and modulating the encoded transmit data for a sub-carrier index based on the allocation information signal, according to:

$$M_k = \begin{cases} \text{Mapping \& Modulation,} & \text{if } k \text{ is allocated} \\ 0, & \text{Else} \end{cases} k = -N/2, \ldots, N/2-1$$

wherein $k=-N/2, \ldots, N/2-1$.

43. The apparatus of claim 38 wherein the means for generating the transmit signal comprises:
means for processing a first transmitter diversity signal of the transmitter diversity signals using the first operational mode control signal; and
means for processing a second transmitter diversity signal of the transmitter diversity signals using the second operational mode control signal.

44. The apparatus of claim 43 wherein the means for processing one of the first and second transmitter diversity signals comprises:

means for converting one of the first and second transmitter diversity signals to the transmit signal;

means for inserting a guard band to the transmit signal; and means for performing RF functions on the transmit signal.

45. The apparatus of claim 30 further comprises:

means for encoding transmit data provided by a Medium Access Control (MAC) processor; and means for mapping and modulating the encoded transmit data for a sub-carrier index based on the allocation information signal to provide the mapped signal $M_k$, according to:

$$M_k = \begin{cases} \text{Mapping \& Modulation}, & \text{if } k \text{ is allocated} \\ 0, & \text{Else} \end{cases} k = -N/2, \ldots, N/2-1$$

wherein $k = -N/2, \ldots, N/2-1$.

46. The apparatus of claim 30 wherein the transmitter diversity signals are compatible with a multi input multi output (MIMO) orthogonal frequency division multiplexing access (OFDMA) standard.

* * * * *